United States Patent [19]
Strömberg et al.

[11] 4,367,401
[45] Jan. 4, 1983

[54] DEVICE FOR INDICATING INADMISSIBLE LENGTH DEVIATIONS OF A PERFORATED WEB

[76] Inventors: Sven A. R. Strömberg, Hjortgatan 5, 533 00 Gotene; Karl-Axel Gullstrand, Hjalmarsvag 3, 260 34 Morarp, both of Sweden

[21] Appl. No.: 154,414
[22] PCT Filed: Jan. 4, 1979
[86] PCT No.: PCT/SE79/00001
  § 371 Date: Aug. 31, 1979
  § 102(e) Date: Aug. 31, 1979
[87] PCT Pub. No.: WO79/00477
  PCT Pub. Date: Jul. 26, 1979

[30] Foreign Application Priority Data
  Jan. 4, 1978 [SE] Sweden .............................. 7800097

[51] Int. Cl.³ .............................................. G06M 3/08
[52] U.S. Cl. ......................... 235/92 DN; 235/92 CC; 235/92 CT
[58] Field of Search ........ 235/92 CC, 92 DN, 92 SB, 235/92 PE, 92 CT, 103.5 E; 226/111, 195, 28

[56] References Cited
U.S. PATENT DOCUMENTS

| | | | |
|---|---|---|---|
| 3,031,118 | 4/1962 | Frommer | 226/28 |
| 3,637,998 | 1/1972 | Sylvester et al. | 235/92 DN |
| 3,808,407 | 4/1974 | Ratz | 235/92 CC |
| 3,838,254 | 9/1974 | Halter | 235/92 CC |
| 4,001,562 | 1/1977 | McEnery | 235/92 CC |
| 4,007,866 | 2/1977 | Traise | 226/111 |
| 4,135,082 | 1/1979 | Borders et al. | 235/92 CC |

*Primary Examiner*—Joseph M. Thesz
*Attorney, Agent, or Firm*—Schwartz, Jeffery, Schwaab, Mack, Blumenthal & Koch

[57] ABSTRACT

The present invention discloses a device for indicating inadmissible length deviations of a perforated web, preferably a formaliner-perforated paper web to be used for the production of forms, where the printing press comprises at least one working mechanism provided with rotating working elements such as a means for punching perforations in the web or possibly a printing unit and where a transmitter receives values corresponding to the velocity of rotation of the rotating working elements and converts the values into pulses, and where another transmitter receives values corresponding to the velocity of the web and converts those values into pulses. The device uses a measuring unit which receives the pulse information from the transmitters in order to continuously indicate and control the length of each length of perforated web during operation of the printing press. For each transmitter, the measuring unit comprises at least a primary counter and a secondary counter. The primary counters operate on the pulse information obtained from the transmitters by delaying the onset of the evaluation of any existing length deviation, and the secondary counters thereafter evaluate any possible length deviations and produce values for manually or automatically adjusting the web length. The measuring unit may also include an impulse and control circuit for controlling a continuous transmission of length deviation values during the operation of the printing press.

10 Claims, 2 Drawing Figures

DEVICE FOR INDICATING INADMISSIBLE LENGTH DEVIATIONS OF A PERFORATED WEB

BACKGROUND OF THE INVENTION

The present invention relates to a device for indicating inadmissible length deviations of a perforated web, preferably a formaliner-perforated paper web to be used for the production of forms, where the printing press comprises at least one working mechanism provided with rotating working elements, such as at least one punching work for punching the perforations of the web, and possibly at least one printing unit, and where at least one transmitter receives values of the velocity of rotation of the working elements of the working mechanism and converts said values into pulses, and at least one transmitter receives values of the velocity of the web and converts said values into pulses and at least one measuring unit receives pulse information from the transmitters.

Upon treating a paper web in a printing press for the production of forms, for instance, the intended result requires a constant so-called "web-length". This is controlled mechanically by a so-called "in-feed variator" which is adapted to brake and thereby to stretch the paper web into a desired length and stretch during the feeding of the unprinted roll through the machine and on the finished roll.

At the same time as the paper is printed in the machine, one or two rows of control perforations are normally punched out (along one or both edges, respectively of the web). These perforations are called "formaliner-perforations" or "-holes" and are standard in practically all form production. These control perforations are used for conveying the paper web in subsequent-treatment machines, for instance (when a plurality of webs are superimposed as an invoice set or the like) or for instance in a customer's writer or data printer. It is very important, therefore, that such control perforations have a standardized spacing, ½ inch (tolerance at a web length of 3 m about ±0.5 mm), while otherwise misalignments may occur due to track-jumping of the web or non-alignment between the different webs.

As mentioned hereabove, the web stretching operation described will influence the length of the paper web, and thus also the mutual spacing of said form aligner holes. If the web is stretched forcefully, the web length will be reduced, thus also reducing the spacing between the form aligner holes so that this spacing becomes too short. If the web is slacked, the web length will increase, and the form-aligner hole-spacing will become too large.

Different paper qualities require different variator settings; the same paper may also vary from one roll to another. The web length is measured manually on a measuring table, and is then samples in the course of the production. Thus there is a demand of being able to measure and adjust the web length continuously in operation in order to prevent the web length from varying from one roll to the next, for example.

Such a measuring equipment, as mentioned hereinbefore, must be able to evaluate deviations less than ±0.5 mm at a measured web length of 3 m, which means maximum a tolerance of about ±1/6 of 0.5 mm (ca 1/6 of 3 m equals 1 cylinder cycle of the working tool and its pulse transmitter in the machine. This would require a transmitter with an enormous resolution (ca 10,000 pulses per cycle) for the intended sensibility or response, and this is a disadvantage since a printing press often generates vibrations which would be propagated to the transmitters and act on the latter, causing faulty indications as a result.

SUMMARY OF THE INVENTION

The present invention has for its object to eliminate the above-described problem. This result, according to the present invention, is reached mainly by the fact that the measuring unit for each transmitter comprises at least one primary counter and at least one secondary counter, said primary counter operating on the pulse information obtained from the transmitters by delaying the onset of the evaluation of any existing length deviation, and said secondary counter thereafter evaluating the possible length deviation in order to obtain values for manually or automatically adjusting the web length, said measuring unit also including at least one impulse and control circuit for controlling a continuous transmission of said values during the operation of the printing press.

BRIEF DESCRIPTION OF THE DRAWINGS

The invention will be described more in detail with reference to the accompanying drawings, in which.

DETAILED DESCRIPTION OF THE INVENTION

Figure 1:
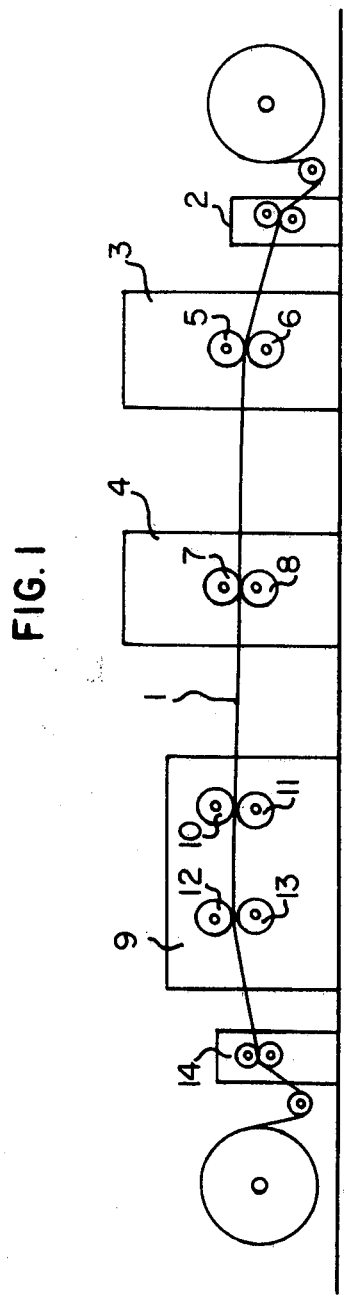
FIG. 1 diagrammatically illustrates a printing press equipped with a device according to the invention.
Figure 2:
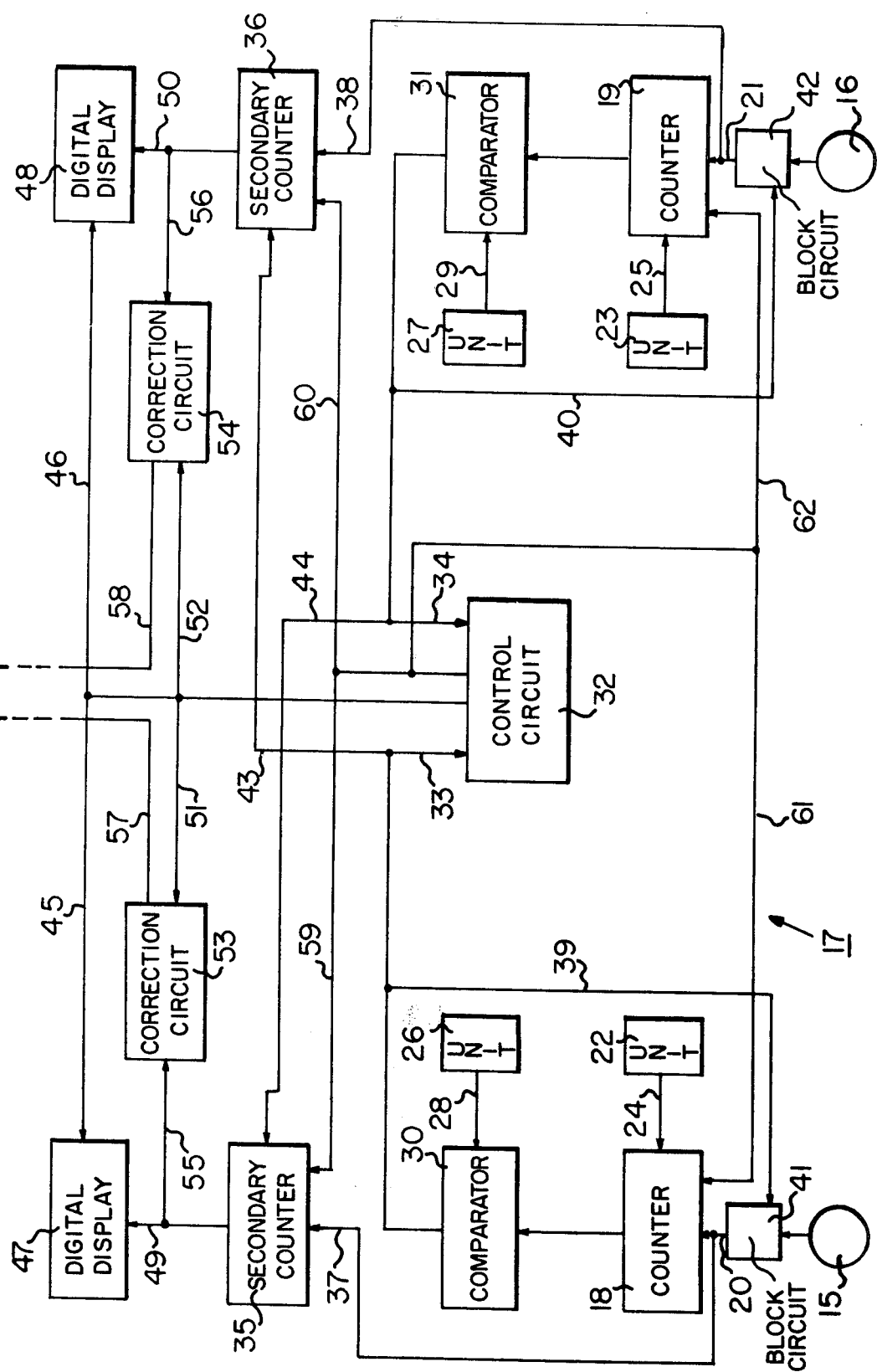
FIG. 2 is a circuit diagram of an electronic unit forming part of the device according to the invention.

The printing press of FIG. 1 serves for the treatment of a paper web 1 by printing and punching steps for the production of forms. The printing press comprises, i.a., a variator 2, which is disposed at the in-feed end for the paper web 1 into the printing press for adjusting the printing press for a definite paper-web length in response to the web quality and other parameters which influence the web length. After the variator, the web is fed into at least one working mechanism provided with rotating working elements and consisting of at least one punching mechanism and possibly at least one printing mechanism. The working mechanism in the embodiment exemplified in FIG. 1 comprises two printing mechanisms 3 and 4 having printing rolls 5, 6 and 7, 8, respectively, which provide the paper web with any desired text, symbols, etc., and a punching mechanism 9 for punching control or formaligner holes or perforations in the paper web by means of rolls 10, 11, 12 and 13. In order to make sure that the form-aligner holes are punched out with the correct interspacing, the speed of rotation of, for instance, the roll 12 in the punching mechanism 9 is read out, and the values obtained is compared with a value obtained by reading-off the speed of rotation of a sensor 14 disposed at the paper web 1. This reading-off and the comparison of the values as well as any correction of the in-feed velocity of the paper web are carried out by the aid of the inventive arrangement to be described more closely in connection with FIG. 2. The inventive arrangement in principle comprises, on one hand, at least one transmitter which is supplied with values of the speed of rotation of the working elements of the working mechanism and converts these values into pulses, and on the other hand at least one transmitter which is supplied with values of the web speed and converts these values into pulses, and, additionally at least one measuring unit which is supplied with pulse information from said transmitters, supplies values for manually or automatically adjusting the web length, and repeats its supplying of values during the operation of the printing press.

In detail, the arrangement functions so that the pulses are first sent from the sensors into the primary counter circuit of the respective channel. This will initiate a counting-up from a set so-called starting level, until one of the primary counters will have reached its final count or level. This will require about 10,000 pulses, corresponding to a web length of about 5 meters, which will thus be the real length measure instead of the above-mentioned about 3 meters. This primary counting represents a kind of time delay, during which the possibly existing web-length fault continously increases, to be subsequently read-off. This will cause the fault to be distributed over a measuring distance of about 10 cylinder cycles, and the transmitters thus need only have a resolution of 1/10 of that previously mentioned in order to reach the same sensibility. Since this so-called delay is not time-conditioned but consists of counting stages controlled by the measuring pulses, which are directly connected to printing press and web, the measuring length and the fault, if any, will always be the same irrespective of the speed of the printing press. As one of the primary stages has reached its set final value, the secondary counter of the second channel will become actuated to indicate any delay (the measuring fault) and to visually present the same, as well as to signal a servomotor to adjust the in-feed variator.

This is enabled by the transmitters 15 and 16, respectively, converting the speed of rotation of the punch and the speed (feed length) of the paper web, respectively, into pulses which are supplied to primary counter 18 and 19 of the measuring unit 17 via leads 20 and 21, respectively. These counters then count up from a programmed starting level indicated by a signal from a unit 22 and a unit 23, respectively (the starting level of unit 23 being adjustable for compensation of any indicating fault caused by machine or transmitter deviations) through leads 24 and 25, respectively, to a programmed final level which is indicated by a signal from units 26 and 27, respectively, through a lead 28 or 29, respectively. Since the transmitter pulses correspond to a certain true feed-length, the paper web being measured, in practice will always be about 5 meters. When the length of the paper web is correct, the two counters will count substantially synchronously which means that they reach their final level simultaneously. As both counters reach the final level or count (synchronously or non-synchronously), which can be ascertained in comparator units 30 and 31, respectively, which, in addition to their connection to the counters 18 and 19, respectively, are also connected to the respective unit 26, 27 for indicating the final count, a signal is given to an impulse and control circuit 32 through leads 33 and 34, respectively, and to secondary counters 35 and 36, respectively, through leads 43 and 44, respectively, to cause actuation thereof. If the primary counters reach final count simultaneously, the result will be zero. On the other hand, if a web-length fault has developed, then this is allowed to increase continously in the course of the primary counting, resulting in that the primary counters will become more and more non-synchronous. As one of the primary counters first reaches the final count (which primary counter this will be, depends on the conditions of the web of being too long or too short), it will send on a lead 39 or 40, respectively, a blocking signal for its own transmitter input in order, through a blocking circuit 41 or 42, respectively, between the transmitter and the primary counter, to block ifself and its secondary counter (thus preventing any further counting pulses from being fed into this channel), and to activate the secondary counter of the opposite channel through a lead 43 or 44, respectively. The primary counter of this channel will continue counting in parallel with its thus now actuated secondary counter through lead 37 and 38, respectively, until this primary counter, too, reaches the final count, after which, via lead 39 or 40, it will give, on one hand, a blocking or latching signal to block its own transmitter input and its own secondary counter, and, on the other hand, to activate through lead 44 or 43, the secondary counter 35 or 36 of the opposite channel. This secondary counter will contain the information zero since it belongs to the primary counter which was the first to reach the final count and was blocked. Consequently, the counting pulses for this counter were blocked before the counter was actuated.

The other secondary counter 36 or 35 now contains the counting information corresponding to the measuring error, since this counter was actuated by the final-count signal of the opposite primary counter and then counted in parallel with its own pirmary counter until the same, too, reached the final count and blocked its incoming counting pulses. (The difference between the pulse counts in the primary counters of the various channels corresponds to the measuring error). Thus, at the present moment, the information about any measuring error is contained in one of the two counters (the specific counter depends on whether the measuring error was negative or positive). This is evaluated by the impulse and control circuit 32 which is actuated at the moment the last primary counter reaches the final count. The impulse and control circuit 32 immediately emits two signals in rapid succession, first on leads 45, 46, respectively, for presenting visually the value of the secondary counters on their respective digit displays 47, 48 which are supplied with said values via leads 49 and 50, respectively, from the respective secondary counters, and secondary, on leads 51 and 52, respectively, to actuate the correction circuits 53 and 54, respectively, to read out their respective secondary counters via leads 55 and 56, respectively, and to convert the measuring error, if any, into a control signal for the servomotor (not shown) which signal is supplied through a lead 57, 58, respectively, and thereafter, via leads 59, 60, respectively, to give resetting signal to the two secondary counters to be reset to zero, and, via leads 61, 62, respectively, for signalling the two primary counters to be set to their respective starting level.

When this has been completed, the information contained in the respective primary counter and the final count of the latter thus is no longer equal, the comparator units will become inactive, and the respective signals at the final level will be switched out. This will result, on one hand, in that the secondary counter of the opposite channel will become inactive, and, on the other hand, in activating the measuring input of the channel proper, and a new measuring cycle is initiated. This will occur continuously during the operation of the printing press at a speed of about 1 measuring cycle per second at a normal speed of production of the press.

Each primary counter 18 and 19, respectively, and their comparators 30 and 31, respectively, has a counting capacity of, for instance, four digits (from 0–9999), and each secondary 35 and 36, respectively, has a counting capacity of, for instance, three digits (from 0–999).

The invention is not restricted to the arrangement described hereinbefore, but can be varied within the scope of the appended claims.

We claim:

1. A device for determining length variations of a perforated web on a printing press having at least one rotating work means, wherein the web travels generally through the press comprising:

a first transmitter means, associated with said rotating work means for producing pulses proportional to the speed of rotation of said rotating work means;

a second transmitter means for producing pulses proportional to a velocity of said web in said press;

a first counter means associated with said first transmitter, for receiving said pulses therefrom;

a second counter means associated with said second transmitter means for receiving said pulses therefrom;

said first and second counter means having associated means for delaying evaluation of length variations in said web based on said pulses received by said counter means from said transmitters and means for evaluating said length variations.

2. The device of claim 1 further including a control circuit means associated with said first and second counter means for controlling a continuous transmission of length variation values during the operation of said printing press.

3. The device of claim 1 or 2, wherein said first counter means comprises a first primary counter and a first secondary counter.

4. The device of claim 3, wherein said first primary counter has a means associated therewith for starting said first primary counter from a first predetermined level, said level being adjustable.

5. The device of claim 1 or 2, wherein said second counter means comprises a second primary counter and a second secondary counter.

6. The device of claim 5, wherein said second primary counter has a means associated therewith for starting said second primary counter from a second predetermined level.

7. The device of claim 5, wherein said first transmitter means has a first blocking circuit associated therewith for blocking pulses from said first transmitter means to first primary counter and said first secondary counter and wherein said second transmitter means has a second blocking circuit associated therewith for blocking pulses from said second transmitter means to said second primary counter and said second secondary counter.

8. The device of claim 1, wherein said means for evaluating said length variations is connected to means for adjusting the web length.

9. The device of claim 7 including visual display means connected to said first and second secondary counters.

10. The device of claim 1 or 2, wherein said first counter means comprises a first primary counter and a first secondary counter and wherein said second counter means comprises a second primary counter and a second secondary counter.

* * * * *